US007739715B2

(12) United States Patent
He et al.

(10) Patent No.: US 7,739,715 B2
(45) Date of Patent: Jun. 15, 2010

(54) VARIABLE PLAY SPEED CONTROL FOR MEDIA STREAMS

(75) Inventors: Li-Wei He, Redmond, WA (US); Adil Sherwani, Seattle, WA (US); Patrick N. Nelson, Seattle, WA (US); Richard William Saunders, Lake Forest Park, WA (US); Jonathan M. Cain, Seattle, WA (US); Anders E. Klemets, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1579 days.

(21) Appl. No.: 10/602,847

(22) Filed: Jun. 24, 2003

(65) Prior Publication Data

US 2004/0267952 A1   Dec. 30, 2004

(51) Int. Cl.
 *H04N 7/173* (2006.01)
(52) U.S. Cl. .............................. 725/90; 725/86; 725/87; 725/88; 725/95; 725/102
(58) Field of Classification Search .................. 725/87, 725/88, 90, 93, 95, 102
See application file for complete search history.

(56) References Cited

U.S. PATENT DOCUMENTS

| 4,091,242 | A |   | 5/1978  | Carrubba et al.                |
|-----------|---|---|---------|--------------------------------|
| 5,586,264 | A | * | 12/1996 | Belknap et al. ......... 725/88 |
| 5,659,539 | A | * | 8/1997  | Porter et al. ........... 725/90 |
| 5,874,986 | A | * | 2/1999  | Gibbon et al. .......... 725/134 |
| 5,893,062 | A | * | 4/1999  | Bhadkamkar et al. ..... 704/270 |
| 5,915,094 | A |   | 6/1999  | Kouloheris et al.              |
| 5,987,590 | A | * | 11/1999 | Wing So ................ 712/35 |
| 6,020,912 | A | * | 2/2000  | De Lang ................ 725/91 |
| 6,070,228 | A | * | 5/2000  | Belknap et al. .......... 711/118 |
| 6,262,724 | B1 | * | 7/2001  | Crow et al. ............ 715/723 |
| 6,385,771 | B1 | * | 5/2002  | Gordon ................. 725/90 |
| 6,415,326 | B1 |   | 7/2002  | Gupta et al.                   |
| 6,434,748 | B1 | * | 8/2002  | Shen et al. ............ 725/89 |
| 6,473,441 | B1 | * | 10/2002 | Dygert ................. 348/465 |
| 6,557,042 | B1 |   | 4/2003  | He et al.                      |
| 6,711,741 | B2 | * | 3/2004  | Yeo .................... 725/87 |
| 6,738,980 | B2 | * | 5/2004  | Lin et al. .............. 725/90 |
| 6,757,906 | B1 | * | 6/2004  | Look et al. ............ 725/45 |
| 6,857,130 | B2 | * | 2/2005  | Srikantan et al. ....... 725/93 |
| 6,990,512 | B1 | * | 1/2006  | Major et al. ........... 709/203 |
| 6,993,787 | B1 | * | 1/2006  | Kamel et al. ........... 725/88 |
| 7,272,298 | B1 | * | 9/2007  | Lang et al. ............ 386/83 |

(Continued)

OTHER PUBLICATIONS

Meng, Zhe, et al., "A Real-Time Compression Code Algorithm on MPEG-2 Audio Based on DSP," Journal of Wuhan University of Technology (Information & Management Engineering, vol. 24, No. 3, Jun. 2002, pp. 63-65 & 73.

(Continued)

*Primary Examiner*—Scott Beliveau
*Assistant Examiner*—Jeremy Duffield
(74) *Attorney, Agent, or Firm*—Lee & Hayes, PLLC

(57) ABSTRACT

Systems and methods are described that support variable play speed control for media streams. The variable play speed control for media streams discussed herein provides an end-to-end solution for media stream delivery, playback, and user interface that enables end users and software developers to dynamically control the playback speed of media streams without losing the ability to comprehend the media content.

69 Claims, 8 Drawing Sheets

U.S. PATENT DOCUMENTS

| | | | |
|---|---|---|---|
| 7,295,520 B2* | 11/2007 | Lee et al. | 370/236 |
| 2003/0093803 A1* | 5/2003 | Ishikawa et al. | 725/88 |
| 2004/0125757 A1* | 7/2004 | Mela et al. | 370/261 |

OTHER PUBLICATIONS

Kim, Jae-Won, et al., "Remote Control System Using Real-Time MPEG-4 Streaming Technology for Mobile Robot," 2002 Digest of Technical Papers, International Conference on Consumer Electronics, Jun. 18-20, 2002, pp. 200-201.

Covell, Michele, et al., "FastMPEG: Time-Scale Modification of Bit-Compressed Audio Information," 2001 IEEE International Conference on Acoustics, Speech, and Signal Processing, May 2001, Part vol. 5, p. 3261-4.

Tan, Yap-Peng, et al., "Video Transcoding for Fast Forward/Reverse Video Playback," Proceedings 2002 International Conference on Image Processing, Sep. 2002, p. I-713-16 vol. 1.

Jo, Jinyong, et al., "Synchronized one-to-many media streaming with adaptive playout control," Proceedings of the SPIE—The International Society for Optical Engineering Conference, Jul. 2002, vol. 4861, p. 71-82.

* cited by examiner

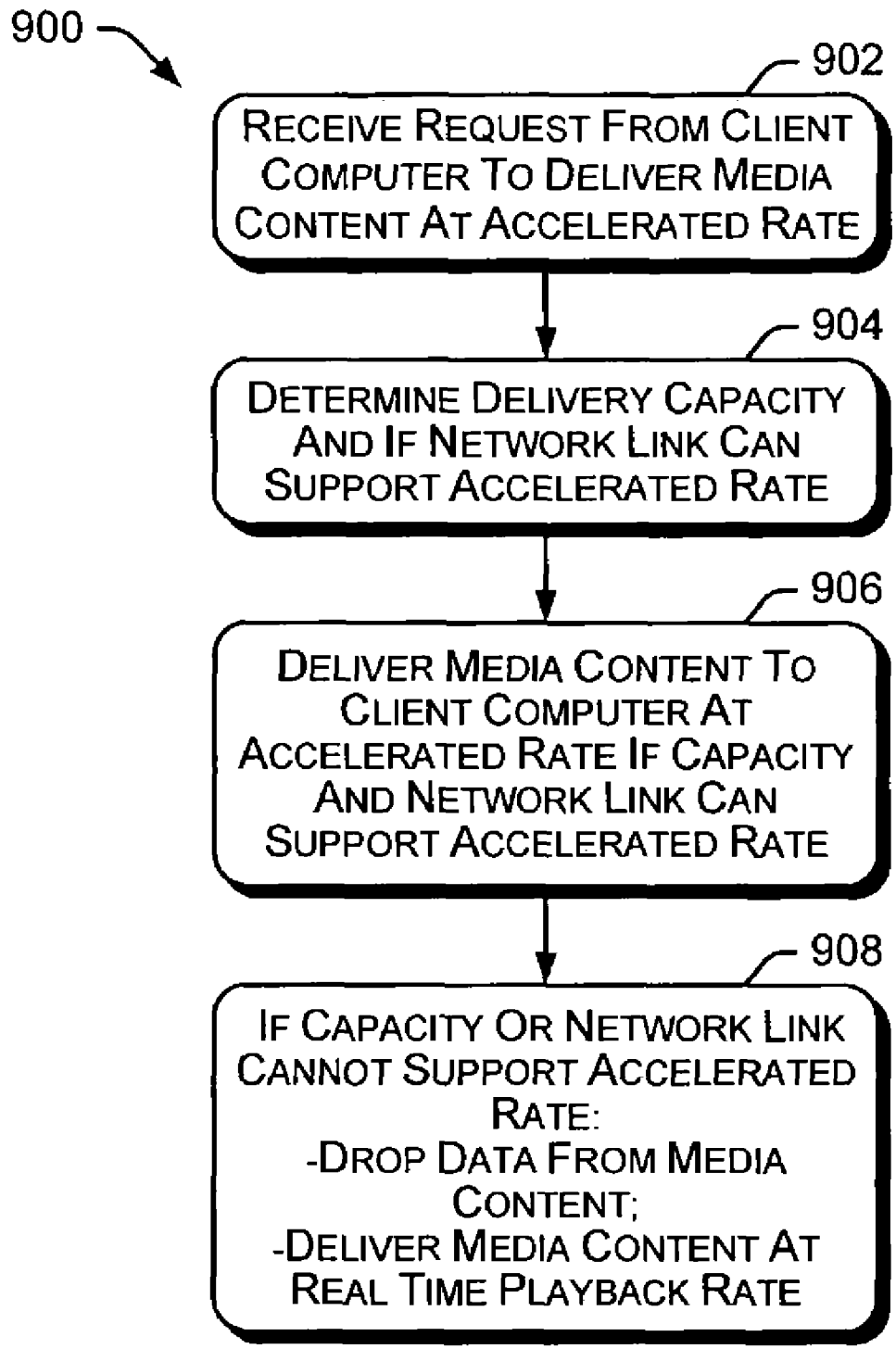

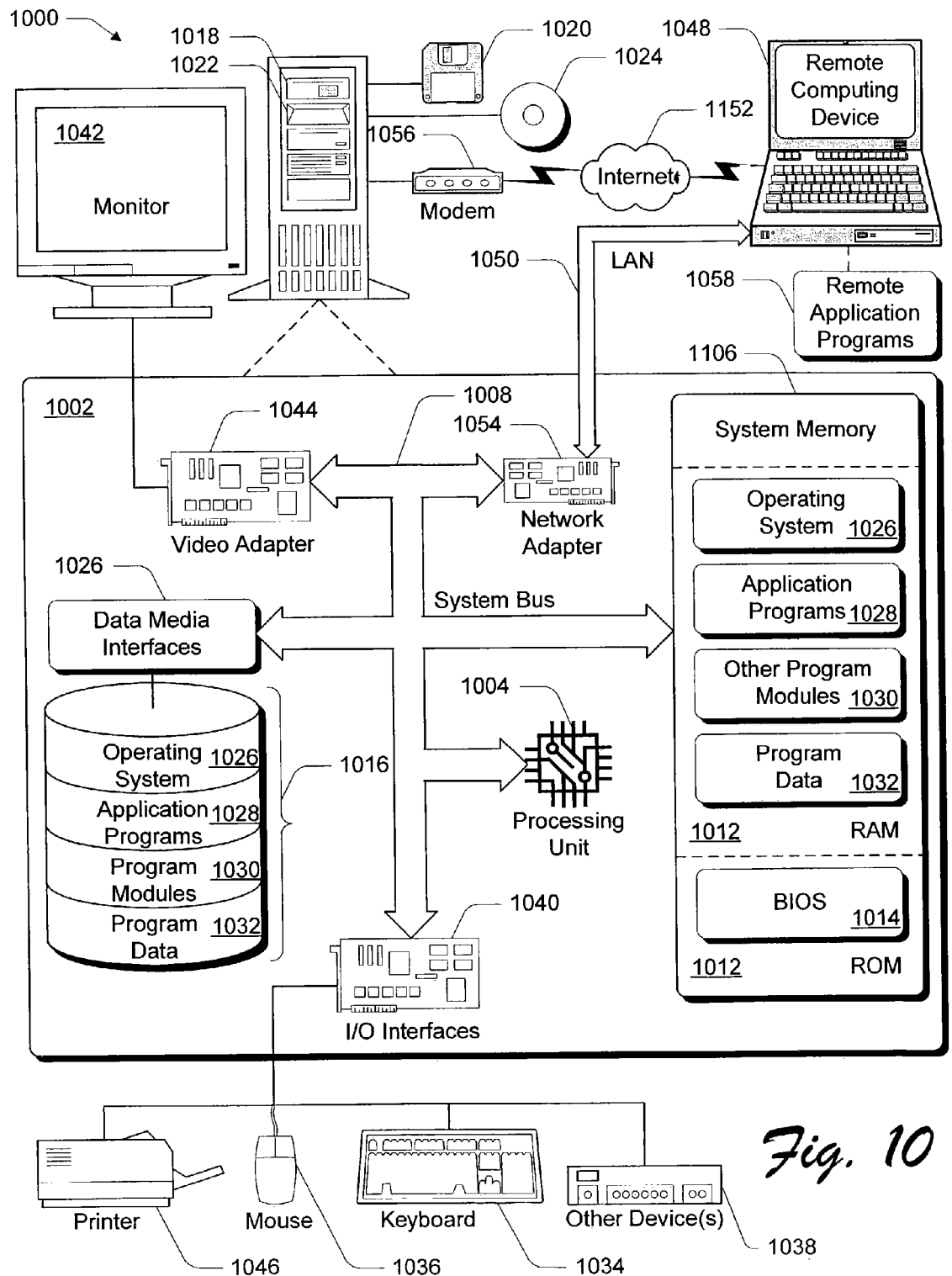

VARIABLE PLAY SPEED CONTROL FOR MEDIA STREAMS

TECHNICAL FIELD

The present disclosure generally relates to streaming media, and more particularly, to providing variable play speed control for playing back media streams.

BACKGROUND

As the popularity of playing multimedia content over the Web has increased the methods for accessing such multimedia content have continually improved. Initially, playing multimedia content (e.g., audio and video) was primarily a download-and-play technology. This method requires that an entire media file be downloaded from a Web server before it can be played. Thus, a media file becomes a local file on a client computer prior to being played back on the client Because media files are typically quite large, however, the download-and-play method can require a significant amount of time to download a media file before the file can be played back.

Another method for accessing multimedia content, called a progressive download, also uses a standard Web server to supply data (e.g., a compressed media file) to a client. In this method, however, the client begins playing back the media file before the entire file is fully downloaded from the server. Thus, the time between a media selection and the beginning of playback is typically much shorter with this method than with the download-and-play method previously discussed. Playback of the media file begins during the streaming of the file, once the client has buffered a few seconds of content. The buffering provides a small backlog of information so the media can continue to play uninterrupted, even during periods of high network congestion. With the progressive download delivery method, the client retrieves data as fast as the Web server, the network and the client will allow, without regard to the bit-rate parameter of the compressed media stream.

Streaming media servers provide still another method for accessing multimedia content. In the streaming media server method, a compressed media file is stored on a specialized streaming media server instead of a Web server. Unlike a Web server, which simply delivers data as fast as it can, a streaming media server can actively and intelligently send data to a client. The data is delivered at the data rate associated with the compressed media streams (e.g., audio and video streams), which is the exact real-time rate at which the data will be played back. The server and client communicate during the delivery process and the server can respond to feedback from the client. Among other benefits, the streaming media server's "just-in-time" manner of delivering data preserves network bandwidth that can be used to service more clients.

One important aspect of accessing media content, regardless of the method of delivery, is the ability to navigate the content and/or find specific locations within the content. However, the current methods discussed above for accessing/delivering multimedia content have significant disadvantages in this regard. For example, although some media players provide navigation functions such as fast forward and rewind, content delivery systems (e.g., Web servers, streaming media servers) may not support such accelerated or decelerated playback. Web servers, for example, are not configured to comprehend a client request for accelerated playback. In addition, even when streaming media servers support accelerated playback (or decelerated playback), the ability of a user to comprehend the content at the accelerated rate is greatly diminished because traditional streaming media servers simply drop data from media streams and only send "key frames" of video to achieve the accelerated rate. Thus, there is no true acceleration of the content. Rather, there is a "skipping" through the content. For example, a fast forward request (e.g., a request for 5 times the normal/real-time delivery/playback rate) from a client might result in the streaming media server sending only 1 video frame for every 8 seconds worth of content. This is approximately equivalent to dropping 239 out of every 240 video frames from a video stream. Thus, fast forwarding results in a jerky effect, as if a sequence of still images is being delivered. In addition, traditional streaming media servers typically drop the entire audio stream from the media content if asked to accelerate content delivery, because the servers assume there is not enough bandwidth to send the entire stream over the network at 5 times the real-time playback rate. Also, client based media players typically drop the audio stream when fast forwarding, even when playing a local file, because they assume that the fast forwarded audio playback produces high-pitched, "chipmunk" sounding audio that is mostly incomprehensible. Furthermore, any non-continuous, non-video/audio data stream (e.g., script commands for triggering events, captions, metadata) included within the media content, and synchronized to play at particular times during video playback, is typically lost due to the "skipping" through the video content.

One attempt to address the problems with navigating media content has been the development of "add-ons" for client media players. Add-ons are software additions that can be added onto an existing media player to provide an improved media content navigation experience. Although such add-ons may provide some benefits under certain circumstances, they have significant disadvantages. For example, such add-ons can provide an accelerated playback only when the media content is present in a local media file residing on the client computer. Thus, the drawbacks of the download-and-play method discussed above apply. Add-ons generally operate by tricking the underlying media player engine into consuming data at a faster rate while providing no mechanism for requesting accelerated delivery from a content delivery system (e.g., a streaming media server, a Web server). Thus, if the media content is not already presently available at the client in a local file, playback can only occur as fast as data arrives from a streaming media server or Web server. Therefore, use of add-ons when the media source is a streaming media server results in playback at the data rate associated with the compressed media stream being delivered to the client computer. When a standard Web server is the media source, use of an add-on can result in playback at rates that are various and unknown because the data delivery rate from the Web server depends on momentary network bandwidth availability and other varying factors. This can make it difficult or impossible to comprehend the media content. In addition, such add-ons provide no control over other functions of a media player because they are not an integral part of the player. Thus, use of an add-on can result in a loss of other basic controls on a media player such as "play", "stop" and "pause".

Accordingly, a need exists for an integrated and comprehensive solution capable of supporting variable play speed control for media streams.

SUMMARY

Variable play speed control of media streams is described herein.

In accordance with one implementation, a media stream is received from a source. The source of the media stream is determined. Whether or not the source can deliver the media stream at an accelerated rate is also determined. Variable play speed controls are enabled or disabled depending on the source and on whether the source can deliver the media stream at the accelerated rate.

In accordance with another implementation, media content is requested from a source at an accelerated rate. The accelerated rate is a rate that exceeds a normal playback rate for the media content. A media stream is received that includes an uninterrupted data stream of the media content from which no data has been intentionally dropped. All of the content from the media stream is rendered at the accelerated rate.

In accordance with another implementation, a media player includes variable play speed controls to vary playback speed of a media stream. The media player additionally includes a playback module to enable or disable the variable play speed controls depending on the source of the media stream and whether the source can deliver the media stream at a requested rate, a graphical user interface (GUI) module to support a GUI for presenting the variable play speed controls to a user, and an application programming interface (API) to expose the variable play speed controls to the programmatic control of a custom application program.

BRIEF DESCRIPTION OF THE DRAWINGS

The same reference numerals are used throughout the drawings to reference like components and features.

FIGS. 7-9 illustrate block diagrams of exemplary methods for implementing variable play speed control of media streams.

FIG. 10 illustrates an exemplary computing environment suitable for implementing a client computing device and a content server computing device.

DETAILED DESCRIPTION

Overview

The following discussion is directed to systems and methods that support variable play speed control for media streams. The variable play speed control for media streams discussed herein provides an end-to-end solution for media stream delivery, playback, and user interface that enables end users and software developers to dynamically control the playback speed of media streams without losing the ability to comprehend the media content.

The variable play speed control for media streams combines multiple features into a single integrated end-to-end solution that provides advantages including fully rendered media content at accelerated and decelerated rates. Rendering all the media content (i.e., not skipping video content or leaving out audio content) improves a user's ability to comprehend the content at accelerated or decelerated rates. In addition, rendering all the media content permits true time compression at accelerated rates which reduces the amount of time it takes to consume the content. Furthermore, rendering all the content allows for fully rendering all non-audio/video data within media streams such as script commands for triggering events and other data streams such as captions and metadata.

Other advantages of the disclosed variable play speed control for media streams include audio pitch adjustment to improve a user's ability to comprehend accelerated and decelerated audio content, a graceful degradation of playback quality (e.g., rendering only video or video key frames) in circumstances where a connection or bandwidth do not allow all the content to be rendered, a built-in streaming media platform enabling third party developers to access and take advantage of the variable play speed control, and the ability to implement variable play speed control on media streams from a variety of sources including streaming media servers.

Exemplary Environment

Figure 1:
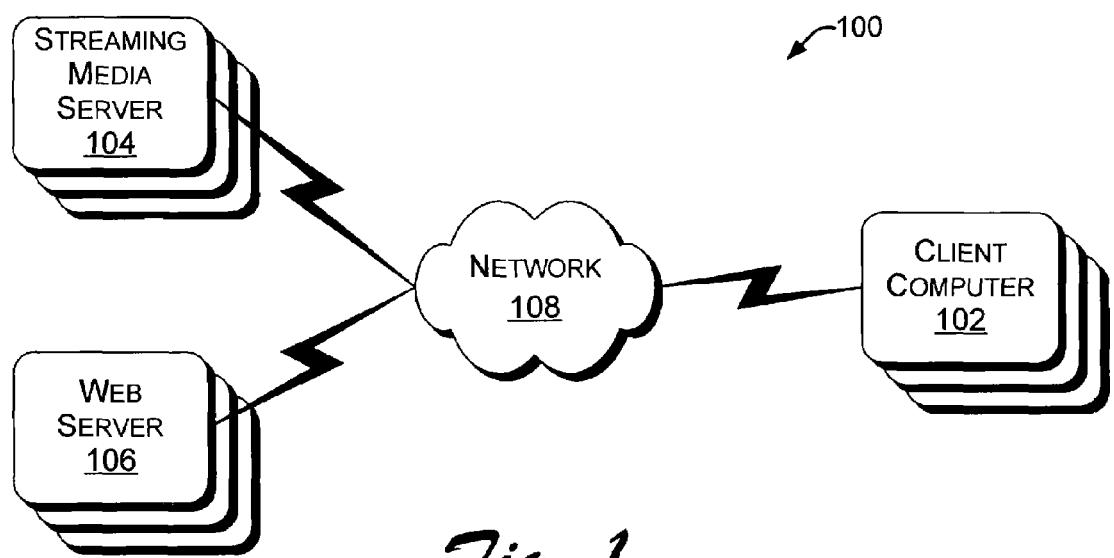
FIG. 1 illustrates an exemplary network environment suitable for implementing variable play speed control of media streams.

FIG. 1 illustrates an exemplary network environment 100 suitable for implementing variable play speed control of media streams. In the exemplary network environment 100, multiple client computing devices 102 are coupled to multiple streaming media servers 104 and/or multiple standard Web servers 106 via a network 108. Network 108 is intended to represent any of a variety of conventional network topologies and types (including optical, wired and/or wireless networks), employing any of a variety of conventional network protocols (including public and/or proprietary protocols). Network 108 may include, for example, the Internet as well as possibly at least portions of one or more local area networks (LANs) and/or wide area networks (WANs).

Requests from a client computer 102 for streaming media content are routed from the client computer 102 to a streaming media server 104 or a standard Web server 106 via network 108. In general, servers 104 and 106 receive requests and return the requested content to the requesting client computer 102 via network 108. More specifically, a media file's URL (Uniform Resource Locator), typically located on a Web page, can be activated to launch a client-side 102 media player and download (i.e., from a Web server 106) or stream (i.e., from a streaming media server 104) the media file to the client 102.

The data in a media file is typically delivered as a compressed media data stream and can include any of a variety of one or more types of content, such as audio, video, text, images, animation, and so on. The data may be publicly available or alternatively restricted (e.g., restricted to only certain users, available only if the appropriate fee is paid, etc.). Additionally, the data may be "on-demand" (e.g., prerecorded and of a known size) or alternatively "broadcast" (e.g., having no known size, such as a digital representation of a concert that is captured live as the concert is performed and made available for streaming shortly after capture).

Delivery (i.e., streaming) of media content from a Web server 106 uses the Hyper Text Transport Protocol (HTTP) which is the standard Web protocol used by Web servers and Web browsers for communication between the server 106 and the client 102. HTTP operates on top of the Transmission Control Protocol (TCP), which handles all the data transfers. TCP is optimized for non-real-time applications such as file transfer and remote log-in. An objective of TCP is to maximize the data transfer rate while ensuring overall stability and high throughput of the entire network 108. When sending data from a server 106 to a client 102, TCP first sends data at a low data rate and then gradually increases the rate until the client 102 reports a data packet loss. TCP then assumes it has hit the bandwidth limit or network congestion, and starts over by sending data at a low data rate. It then gradually increases the data rate and repeats the process. Thus, delivery of media content from a Web server 106 to a client 102 means that the Web server 106 delivers (and the client computer 102 receives) data as fast as the Web server 106, the network 108 and the client computer 102 will allow without regard to the bit-rate parameter of the compressed media data stream.

By contrast, a streaming media server 104 actively and intelligently manages data delivery to the client computer 102. Thus, the streaming server 104 can deliver media content at the exact data rate associated with the compressed media data streams (e.g., the compressed audio and video streams). The server 104 and client 102 stay in close touch during the delivery process, and the streaming media server 104 can respond to requests from the client. Therefore, the server 104 can also deliver media content at varying data rates requested by the client 102 as discussed in greater detail herein below. While streaming media servers 104 can use the HTTP/TCP protocols used by Web servers 106, they can also use specialized protocols such as the User Datagram Protocol (UDP) to improve the streaming experience. UDP is an ideal protocol for transmitting real-time audio and video data.

In addition to a Web server 106 and a streaming media server 104 as sources of media content, a local storage medium on the client computer 102 itself can be a streaming media source. Media content can be delivered from a local storage medium on the client computer 102 to a media player on the client computer 102. In this case, media content would be sourced from a local media file that would typically have been previously downloaded from a Web server 106 or otherwise stored on the client computer 102.

The client computer 102, streaming media server 104, and Web server 106 can each be any of a variety of conventional computing devices, including desktop PCs, notebook or portable computers, workstations, mainframe computers, Internet appliances, gaming consoles, handheld PCs, cellular telephones or other wireless communications devices, personal digital assistants (PDAs), combinations thereof, and so on. One or more of devices 102, 104 and 106 can be the same types of devices, or alternatively different types of devices. An exemplary computing environment for implementing a client computer 102, a streaming media server 104, and a Web server 106 is described in more detail herein below with reference to FIG. 10.

The implementation of variable play speed control for media streams with respect to each of the media sources mentioned above (i.e., a Web server, a streaming media server, and a local medium) is discussed in greater detail below with regard to exemplary embodiments.

Exemplary Embodiments

Figure 2:
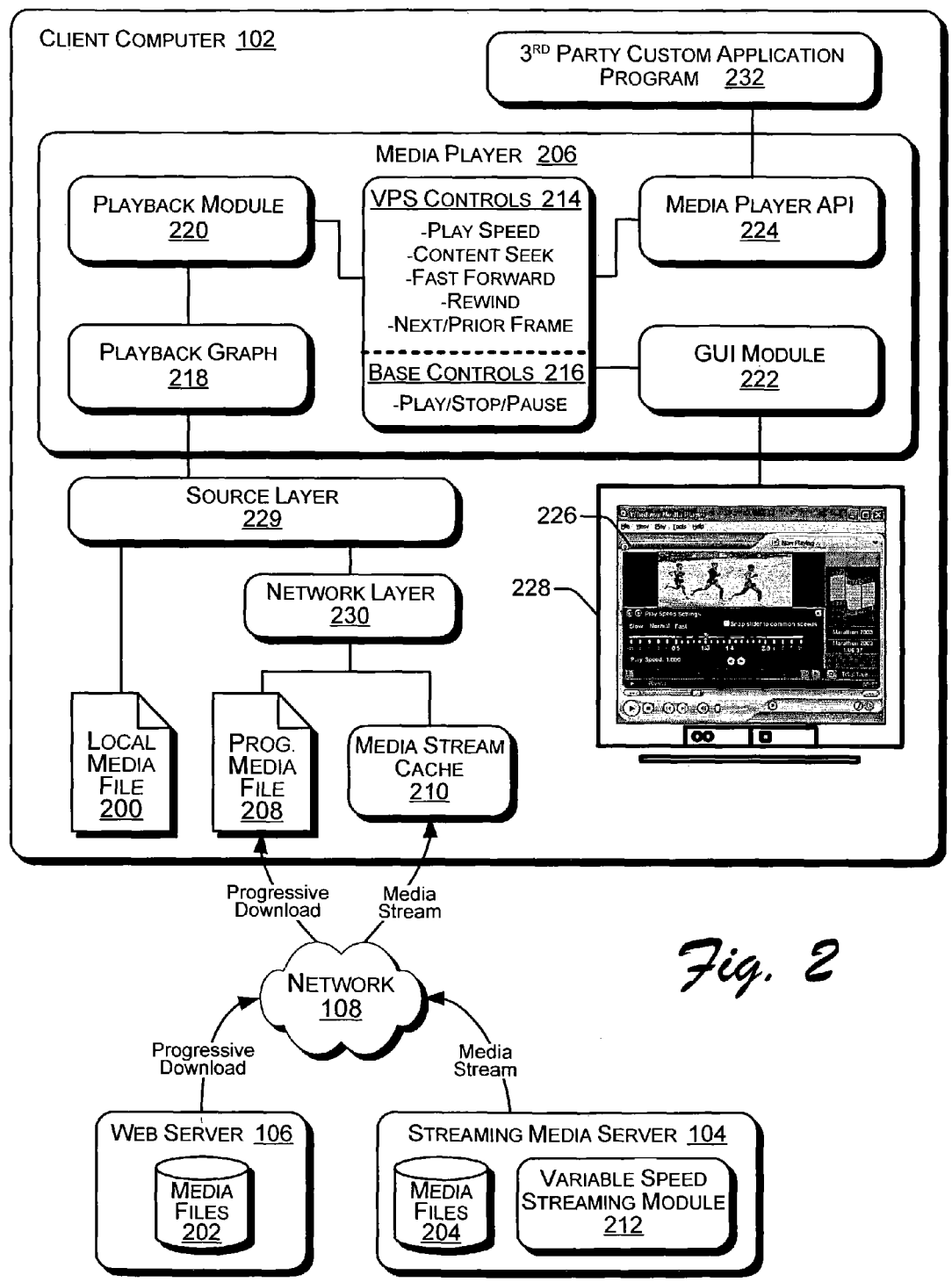
FIG. 2 illustrates an exemplary embodiment of a client computer suitable for implementing variable play speed control of media streams in conjunction with various media content sources.

FIG. 2 illustrates an exemplary embodiment of a client computer 102 suitable for implementing variable play speed control of media streams received from various sources. The media streams may be delivered to client computer 102 from various media file sources that include a Web server 106, a streaming media server 104, and a local media file 200 previously stored on a storage medium (e.g., a hard disc, not illustrated in FIG. 2) of client computer 102. In general, media streams from source media files (e.g., 200, 202, 204) can be played by a media player 206 configured to execute on client computer 102.

Source media files such as files 200, 202 and 204 can be streamed (i.e., delivered) to a client computer 102 in accordance with any of a variety of different streaming media formats. These formats can include audio formats, audio-video formats, or various other formats now existing or yet to be created by a content provider. For example, media can be streamed in accordance with the ASF format (Advanced Systems Format or Advanced Streaming Format). Additional information regarding ASF is available from Microsoft® Corporation of Redmond, Wash. Alternatively, or in conjunction with the ASF format, other streaming media formats may be used such as WMA (Windows Media Audio), WMV (Windows Media Video), MPEG (Moving Pictures Experts Group)-1, MPEG-2, MPEG-4, Quicktime, and so on.

Accordingly, client computer 102 of FIG. 2 includes a media player 206 and at any given time may also include a local media file 200, a progressively downloaded media file 208, and a media stream cache 210 of a streamed media file. Traditionally, there are three ways of delivering "streaming media" (e.g., media files having audio and video data) to an end user operating a media player 206 on a client computer 102. The first is through a local media file 200 that has been previously loaded onto a storage medium of client computer 102, such as a hard disc. There are various ways a local media file 200 can be loaded onto client computer 102 including, for example, from a portable storage medium (e.g., floppy disc, optical disc, memory stick, etc.) inserted into client computer 102 or through a download from a standard Web server 106. Once the local media file 200 is completely loaded onto client computer 102, it can be played by a media player 206 directly from the storage medium of the client computer 102.

A second way to deliver streaming media to a client computer 102 is through a progressive download of a media file 202 from a standard Web server 106. Media files 202 are typically stored on, and downloaded from, a Web server 106 in a compressed format. The media file 202 is saved locally as a progressive download media file 208 in a manner similar to the download-and-play method of the local media file 200 discussed above. However, in the progressive download method, while the streaming media file 202 is being delivered from the Web server 106, the media player 206 on client computer 102 begins playing the media content (e.g., audio and/or video streams) after a few seconds of buffering. Thus, the client 102 implements a "progressive playback" as the Web server 106 "progressively downloads" the media file. The buffering provides a small backlog of data that allows the media to continue playing uninterrupted even during periods of high network 108 congestion. When media is streamed from a standard Web server 106 as a progressive download, the Web server 106 delivers the data (and the client 102 receives the data) as fast as the Web server 106, the network 108 and the client computer 102 will allow, without regard to the bit-rate parameter of the compressed media data stream.

A third way to deliver streaming media to a client computer 102 is from a media file 204 on a streaming media server 104. Like media files 202 on a standard Web server 106, media files 204 on a streaming media server 104 are typically stored and streamed in a compressed format. As mentioned above, streaming media servers 104 actively and intelligently manage delivery of media data to a client computer 102. Although streaming media servers 104 typically deliver media content at the exact data rate associated with a compressed media file 204, the streaming media server 104 in the embodiment of FIG. 2 is additionally capable of delivering media content at varying rates according to requests made from client computer 102. In general, a variable speed streaming module 212 on streaming media server 104 communicates with media player 206 on client computer 102 and responds to requests to deliver media files 204 at various data rates.

Traditionally, when a media file is streamed from a streaming media server to a client computer, the media file is played directly from the network 108 as it arrives at the client computer. Thus, the streaming media data is not saved locally on the client computer. However, in an embodiment of FIG. 2, a media stream cache 210 is included on client computer 102. The media stream cache 210 supports variable play speed scenarios of the current embodiment in which a live broadcast can be cached so that playback can be accelerated from the beginning of the content in order to "catch up" with the live broadcast. Variable play speed control of the media player 206 is discussed in greater detail below.

Media player 206 of client computer 102 includes various modular software components including variable play speed controls 214, basic transport controls 216, playback filter graph 218, playback module 220, graphical user interface (GUI) module 222 and media player application programming interface (API) 224. It is noted that these components are illustrated as part of media player 206 for purposes of illustration and discussion and not for purposes of limitation. In general, such components comprise various modules (or combinations of modules) having computer/processor executable instructions that may be located in one or more memories (not illustrated in FIG. 2, but see FIG. 10) of client computer 102.

Figure 3:
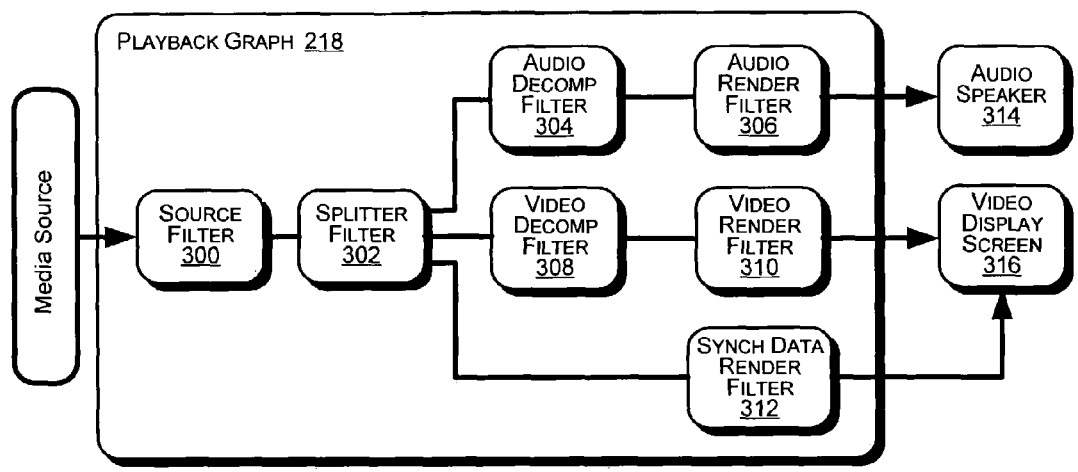
FIG. 3 illustrates an example of a playback filter graph.

The media player 206 generally controls and processes streaming media data from a source media file (e.g., media files 200, 202, 204) through one or more playback graphs 218. As illustrated in FIG. 3, for example, a playback graph 218 includes modular functional components called filters that are graphed together to process media data in particular ways according to particular media data types and user playback preferences. A playback graph typically includes filters that can be categorized into one of three filter types: a source filter, a transform filter, and a rendering filter. A source filter 300 accepts and reads data from a source media file, such as a source files 200, 202 and 204 that may be delivered from a local storage medium, a Web server 106, or a streaming media server 104. Thus, the source filter 300 introduces the source data into the playback graph 218.

A transform filter, such as splitter filter 302 and audio and video decompression filters 304 and 308, accepts data from the source filter 300, processes the data, and forwards the processed data to a rendering filter (e.g., filters 306, 308 and 310). Transform filters can encompass a variety of filter types such as a splitter filter 302 which splits a single media data stream into component audio, video, and other data streams. Audio decompression filter 304 and video decompression filter 308 are transform filters that decompress data streams delivered from compressed media files such as files 200, 202 and 204. Various types of transform filters can be alternately included in a playback graph 218 to cause a particular desired effect in the playback of the rendered data streams. One such filter is an audio pitch adjustment filter that is discussed in greater detail below with reference to variable play speed controls and the playback graph 218 of FIG. 5.

A rendering filter (e.g., audio rendering filter 306, video rendering filter 310, synchronized data rendering filter 312) renders data to a form that is useful in driving a hardware device such as an audio speaker 314 or a video display screen 316. Thus, rendered output is typically supplied to a hardware device (e.g., speaker 314, display screen 316), but could also be supplied to any location that accepts media input (such as a file maintained on a volatile memory, optical disk, hard disk, etc.). In general, media players typically include audio and video rendering filters that comprehend audio and video data types. However, various other types of rendering filters from 3$^{rd}$ party software developers, for example, might also be loaded into a media player graph 218 to enable the player to render previously unknown and custom data types.

It is noted that the playback graph 218 shown in FIG. 3 represents only one of many possible constructions of playback graphs and is not intended as a limitation on the architecture of playback graphs in general. Furthermore, although three basic types of filters are described above, those skilled in the art will appreciate that a filter can represent a combination of different filter types.

Accordingly, playback graphs 218 can vary in their complexity and configuration for any given set of media data types and playback instructions entered by a user through, for example, media player controls 214 and 216. The playback module 220 of media player 206 performs various functions related to the playback of media data including controlling the assembly of the playback graph 218 and managing the flow of data streams within the playback graph 218 by directing the movement of data through the filter components of the playback graph 218.

The playback module 220 supports the construction of a playback graph 218 by locating enabled filters capable of appropriately processing a particular media type in a particular manner. Thus, among other things, the playback module 220 determines a media type for a data stream received by the media player 206 and determines appropriate filters that are available for processing the data stream. The playback module 220 constructs a playback filter graph 218 by connecting filter components into a series of filters beginning with a source filter and ending with a rendering filter as discussed above with reference to the playback graph 218 of FIG. 3. Additional functions of the playback module 220 related to variable play speed controls are discussed herein below.

As illustrated in FIG. 2, the media player 206 supports various playback controls 214 and 216 for controlling media playback. The controls include variable play speed controls 214 and basic transport controls 216. The variable play speed controls include a play speed control, a content seek control, a fast forward control, a rewind control, and a next frame and prior frame control. The basic transport controls 216 include basic controls for playing, pausing, and stopping media playback.

The underlying playback controls (214 and 216) are presented to an end user through a graphical user interface (GUI) 226 that is supported by a GUI module 222. The GUI 226 is displayed on a display device 228. Display device 228 is typically implemented as a display monitor that is a peripheral device coupled to a client computer 102. However, for purposes of discussion, display device 228 has been illustrated in FIG. 2 as being a part of client computer 102. A user has access to playback controls (214, 216) through the GUI 226 presented on display device 228 and through an input device such as a mouse or keyboard (not illustrated in FIG. 2).

Figure 4:
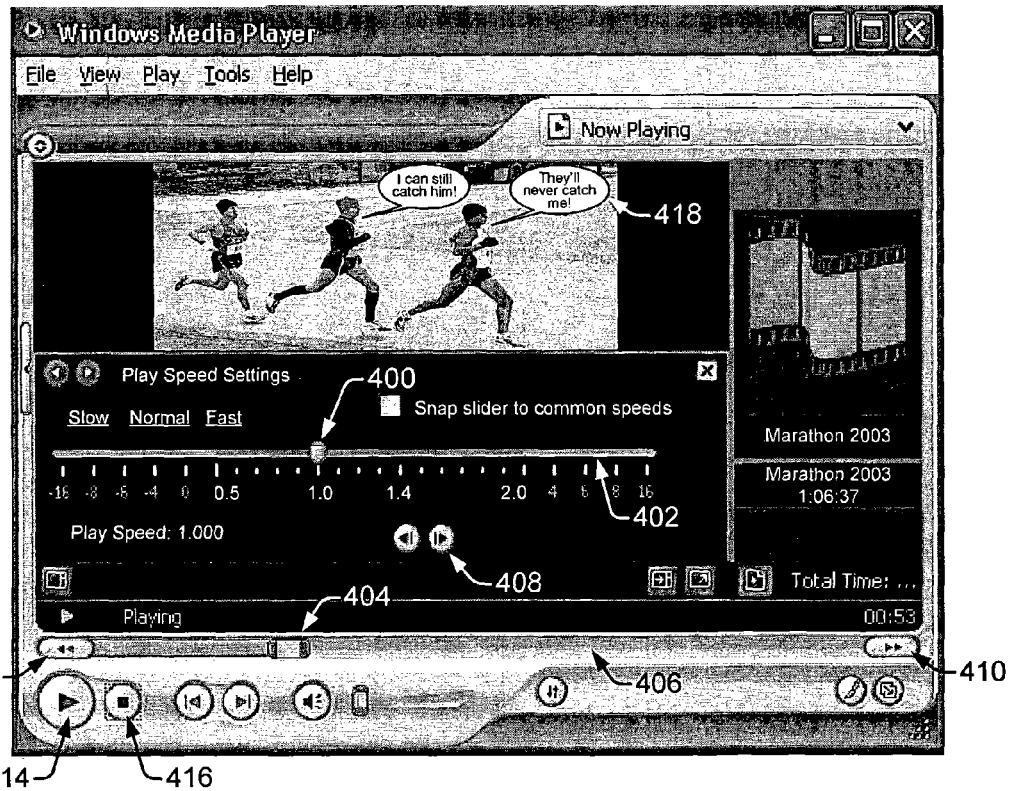
FIG. 4 illustrates an example of a graphical user interface showing various playback controls of a media player.

FIG. 4 shows an example of a GUI 226 that generally illustrates the various playback controls (214 and 216) of media player 206. The play speed control 400 allows a user to dynamically control the playback rate of a media stream being played by media player 206. A user can "grab" the play speed control 400 (e.g., by clicking and holding with a mouse) and drag it to different play speed settings along a graduated playback rate bar 402. By doing so, a user can speed up playback of a media stream beyond a normal, real-time playback rate and slow down playback below the normal, real-time playback rate. A play speed setting of 1.0 indicates the normal, or real-time, playback rate that is intended for consuming the media. The graduated playback rate bar 402 shows a range of "−16 times" the real-time rate to "16 times" the real-time rate. However, the graduated playback rate bar 402 and corresponding rate numbers are also highlighted in a manner that indicates to a user that the range of playback rates in which the media can best be comprehended is between 0.5 times the real-time rate and 2.0 times the real-time rate. It is noted that the rate numbers presented along the graduated playback rate bar 402 are intended as examples only, and while they may be a realistic illustration of useful rate numbers, they are not intended to be a limitation as to the range of rates that might be controlled by the play speed control 400 of media player 206.

The content seek control 404 can also be "grabbed" (e.g., by clicking and dragging with a mouse) and moved to different locations along a content location bar 406. Moving the content seek control 404 moves a user to different locations in a media selection relative to the position of the seek control 404 along the content location bar 406. The next and prior frame controls 408 step a user frame by frame, either forward or backward, through a video presentation. The fast forward 410 and rewind 412 controls speed a user through a media selection, either forward or backward, in a manner similar to that for the play speed control 400. Also shown on the GUI 226 of FIG. 4 are the basic controls 216, play/pause 414 and stop 416.

Each of the variable play speed controls 214 just discussed is configured to initiate some measure of acceleration or deceleration of the playback rate of media streams being processed through a playback graph 218 on media player 206. Moreover, in addition to accelerating or decelerating the playback rate of the media streams in the playback graph 218, each of the variable play speed controls 214 is configured to initiate a request through the playback module 220 to accelerate or decelerate the delivery rate of media streams to the media player 206. Therefore, in addition to controlling the playback graph 218, the playback module 220 communicates with media file sources in order to request varying delivery rates for streaming media according to user input via variable play speed controls 214.

In order to communicate with a media file source, the playback module 220 first determines the source of the media file. The playback module 220 is configured to query the source layer 229 for information about the source type, for example, to determine if the media source is a local media file 200, a progressive download media file 208 from a Web server 106, or a media stream 210 from a streaming media server 104. Queries from the playback module 220 regarding data delivery rates from sources that are not local (i.e., progressive download media files 208 from a Web server 106, or media streams 210 from a streaming media server 104) are delegated to the network layer 230. The network layer 230 is not invoked at all for local media content.

The playback module 220 is also configured to enable or disable the variable play speed controls 214 of the media player 206 based on particular circumstances that indicate whether or not delivery of data at a variable rate is possible. For example, delivery at variable rates is not possible if the media source is a standard Web server 106 or if prohibitive network bandwidth limitations exist. Thus, the playback module 220 determines the source of the media file and determines if the source is capable of delivering data at a variable rate. Based on these determinations, the playback module 220 disables or enables the variable play speed controls 214. Furthermore, the GUI module 222 supports these changes in operability of the variable play speed controls 214 by altering the appearance of the controls 214 on the GUI 226 as they are presented on display device 228. The changes typically manifest themselves through the GUI 226 as coloration differences in the controls 214 that indicate when the controls 214 are enabled or disabled. Therefore, a user is aware of when the variable play speed controls 214 are operable and when they are inoperable.

In the case where the media source is a local media file 200, the variable play speed controls 214 remain enabled because there is not presumed to be a limit on the speed at which data from the local media file 200 can be delivered to the media player 206. Therefore, the playback module 220 services requests for variable play rates initiated by a user from the variable play speed controls 214 by controlling the playback graph 218 to accelerate or decelerate the media data. Thus, the playback module 220 maintains the variable play speed controls 214 in an enabled status and the user is able to manipulate the controls from the GUI 226.

In the case where the playback module 220 determines that the media source is a "progressive download" from a Web server 106, it initially disables the variable play speed controls 214. As mentioned above, Web servers 106 are configured to "progressively download" data as fast as the Web server 106, the network 108 and the client computer 102 will allow, without regard to the bit-rate parameter of a compressed media data stream. Web servers 106 are not configured to comprehend requests regarding variable data delivery rates. Therefore, when the playback module 220 queries the source layer 229 and determines that the media source is a Web server 106, the playback module 220 disables the variable play speed controls 214 on the media player 206 until such time as the entire media file 202 has been downloaded as a progressive download media file 208 onto the client computer 102. Thus, the variable play speed controls 214 will be inoperable during the progressive download, because the Web server 206 is unable to service requests for variable rate delivery of data. However, once the progressive download is complete, the playback module 220 enables the variable play speed controls 214 and continues to control the playback graph 218 to playback the media file 208 in accordance with variable play speed input from controls 214.

In an alternative implementation, the network layer 230 measures the average rate at which media file 202 is being progressively downloaded from Web server 106. The playback module 220 partially enables the variable play speed controls 214 to permit a user to request playback speeds that do not exceed the average download rate. For example, if the average download rate is 3.0× the real-time playback rate, the variable play speed controls 214 may allow the user to request a playback speed in the range of 0.0× to 3.0×. In this example, playback speeds at rates greater than 3.0× would be disabled by the playback module 220.

When the playback module 220 queries the source layer 229 and determines that the media source is a streaming media server 104, it sends requests to the streaming media server 104 for variable rate data delivery that correspond with requests from the variable play speed controls 214 being input by a user. The playback module 220 generally maintains the variable play speed controls 214 in an enabled status unless there is a data delivery problem such as a bandwidth limitation. The playback module 220 communicates with a variable speed streaming module 212 on the streaming media server 104. The variable speed streaming module 212 is configured to respond to requests from the playback module 220 by accelerating or decelerating the delivery rate of data in a media file 204. At any time before or during data delivery, if the server 104 bandwidth or network bandwidth become limited to the extent that accelerated delivery of media data is no longer possible, the playback module 220 may disable the variable play speed controls 214 on the media player 206. In this case, media playback would be maintained at a normal, real-time rate. In another variation, the playback module 220 can disable only relevant controls of the variable play speed controls 214. For example, a user may be allowed to request playback at a rate that is slower than real-time, but might not be allowed to request playback at a rate that is faster than real-time. In yet another variation, the variable speed streaming module 212 on the streaming media server 104 can disable relevant controls of the variable play speed controls 214 based on "policy" settings made, for example, by an administrator of the media server 104. For example, if the administrator of the media server 104 does not want the user to be able to fast-forward or seek through a video advertisement, those buttons, including the variable speed controls, can be disabled in the GUI of the media player by communication with the playback module, even though the media stream is still delivered at an accelerated rate.

Alternatively, the playback module 220 can maintain the variable play speed controls 214 in an enabled state and gracefully degrade the quality of the playback. A graceful degradation of playback quality would result by the playback module 220 first recognizing a data delivery limitation (e.g., limited network bandwidth, limited server 104 capacity) via network layer 230, and then requesting that the variable speed streaming module 212 in the streaming server 104 gracefully throttle back on the amount of data being delivered. The delivery rate of the data can be reduced to the normal or real-time bit-rate of the compressed media stream, but the variable speed streaming module 212 would, for example, deliver only video data and stop delivering audio data, or just deliver key frames (e.g., every $5^{th}$ frame) of the video data. Thus, the variable play speed controls 214 on the media player 206 would remain enabled for use by a user, but the playback quality would be reduced. As soon as playback module 220 recognizes that the data delivery limitation (e.g., limited network bandwidth, limited server 104 capacity) has subsided, the playback module 220 can send a request to the streaming server 104 to restore the playback quality (i.e., by increasing the data delivery rate) and enable the variable play speed controls 214 so that accelerated/variable speed playback can be resumed.

Figure 5:
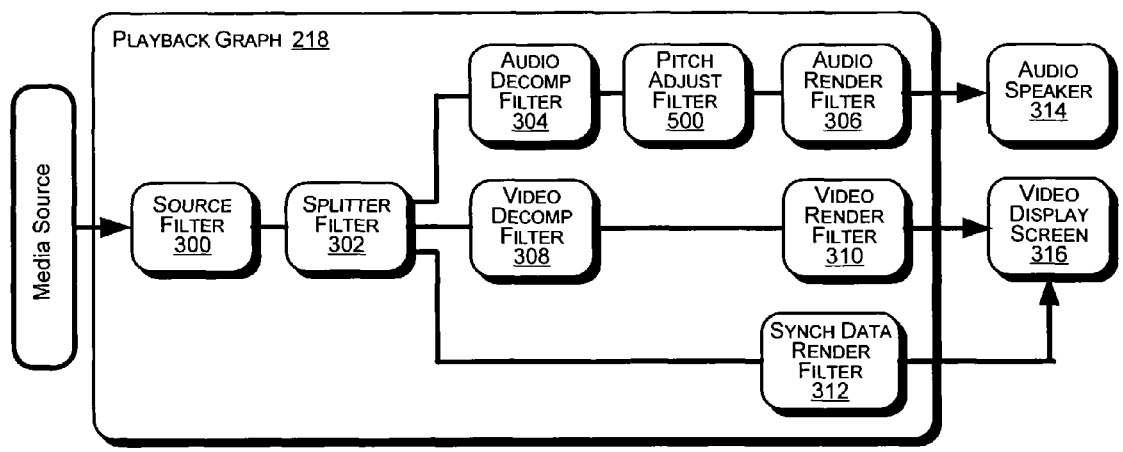
FIG. 5 illustrates an example of a filter graph that has been assembled with a pitch adjustment filter.
Figure 6:
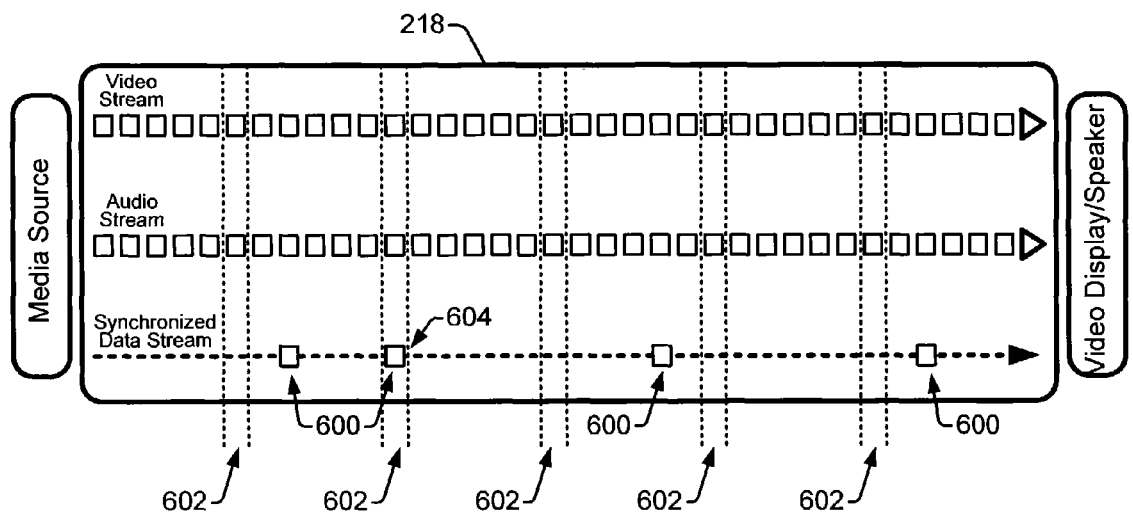
FIG. 6 illustrates an example of media content having a video data stream, an audio data stream and a non-audio/video data stream.

FIGS. 5 and 6 help to illustrate how the playback module 220 manages the playback graph 218 to accelerate or decelerate the media data in a manner that maintains the ability of a user to comprehend the data. As mentioned above, there are various types of transform filters that can be alternately included in a playback graph 218 to cause a particular desired effect in the playback of rendered data streams. FIG. 5 illustrates a playback graph 218 similar to that shown in FIG. 3, but which also includes an audio pitch adjustment filter 500 to process accelerated and decelerated audio data as it passes through the graph 218. One of the playback module's 220 tasks is to manage the playback graph 218 so that when it receives a request to vary the playback rate, it can ensure that the playback graph 218 has the appropriate assembly of filters to process the media data. Therefore, the playback module 220 controls the rate that data proceeds through the playback graph 218 and it also includes the audio pitch adjustment filter 500 for processing the accelerated or decelerated audio data. The audio pitch adjustment filter 500 is a time compression algorithm that makes it possible to have useful speed adjustments in audio playback.

Time compression is a technology that is generally well-known to those skilled in the art that permits changes in the playback rate of audio content without causing the pitch to change. Most systems today use linear time-compression algorithms, where audio/speech content is uniformly time compressed. In this class of algorithms, time-compression is applied consistently across the entire audio stream with a given speed-up rate, without regard to the audio information contained in the audio stream. Additional benefits can be achieved from non-linear time-compression techniques. Non-linear time compression is an improvement on linear compression where the content of the audio stream is analyzed and the compression rates may vary from one point in time to another. Typically, non-linear time compression involves an aggressive approach to compressing redundancies, such as pauses or elongated vowels. One such non-linear time-compression algorithm combines pause-removal with linear time compression. It first detects pauses (i.e., silence intervals) in the audio/speech and then shortens or removes the pauses. Such a procedure can remove 10-25% from normal speech. It then performs linear time compression on the remaining speech.

FIG. 6, in conjunction with FIG. 4, help to illustrate how playing back (i.e., rendering) all the content from a media stream without dropping data, such as dropping video frames, permits the playback of non-continuous, non-audio/video data that may be synchronized to particular locations within video data. Such data may include, for example, script commands for triggering events and other data streams such as captions and metadata.

In FIG. 6, the synchronized data stream represents non-audio/video text captions 600 that are synchronized for display within the video content at various locations. Such captions might be represented in FIG. 4 by the captions 418 shown in the video above the heads of the marathon runners. It is noted that such captions may be implemented in various ways, and that the illustrated form of the balloon text captions 418 shown in FIG. 4 is just one example of a possible implementation. Another likely example for implementing such text captions would be as simple text captions appearing in an area of the screen somewhere below the video display of FIG. 4. As shown in FIG. 6, when the media source (e.g., a streaming media server 104) can deliver data at an accelerated rate rather than having to degrade the quality of the playback by dropping data, all of the data in each of the video stream, the audio stream, and the synchronized data stream can be rendered or played back through playback graph 218. Thus, each point within the video stream where a synchronized text caption 600 occurs will result in the text caption 600 being displayed on the video display. The text captions 418 of FIG. 4 provide an example of captions 600 being displayed.

By contrast, if the media source (e.g., a streaming media server 104) cannot deliver data at an accelerated rate, but instead must degrade the quality of the playback by dropping video frames (i.e., delivering only key frames), then all of the data in the synchronized data stream may not be rendered or played back through playback graph 218. For example, if video data is dropped, resulting in only key video frames 602 being played back, then only the synchronized text captions 604 that occur with the key video frames 602 will be played back on the video display. The result may be that the text captions 418 of FIG. 4 would be left out of the playback. In an alternate implementation, the playback module 220 controls playback graph 218 such that none of the synchronized data stream gets rendered during times when only key frames are being delivered for playback.

As mentioned above, media player 206 also includes a media player application programming interface (API) 224. In addition to the GUI module 222 that maintains GUI 226 through which an end user has access to the variable play speed controls 214, the media player 206 also provides the media player API 224 through which the variable play speed controls 214 are exposed to programmable control. The media player API 224 prescribes specific methods by which $3^{rd}$ party software developers can access the variable play speed controls 214 of the media player 206 for use in custom application programs such as the 3rd party custom application program 232 illustrated in FIG. 2. The API 224 supports the various playback controls (214 and 216) for controlling media playback, including the play speed control, the content seek control, the fast forward control, the rewind control, the next frame and prior frame control, and the play/pause and stop controls. The API also supports capability flags to indicate when the media source can support accelerated data delivery rates.

Exemplary Methods

Example methods for implementing variable play speed control of media streams will now be described with primary reference to the flow diagrams of FIGS. 7-9. The methods apply generally to the exemplary embodiments discussed above with respect to FIGS. 2-6. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use by or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), and a portable compact disc read-only memory (CDROM) (optical).

Figure 7:
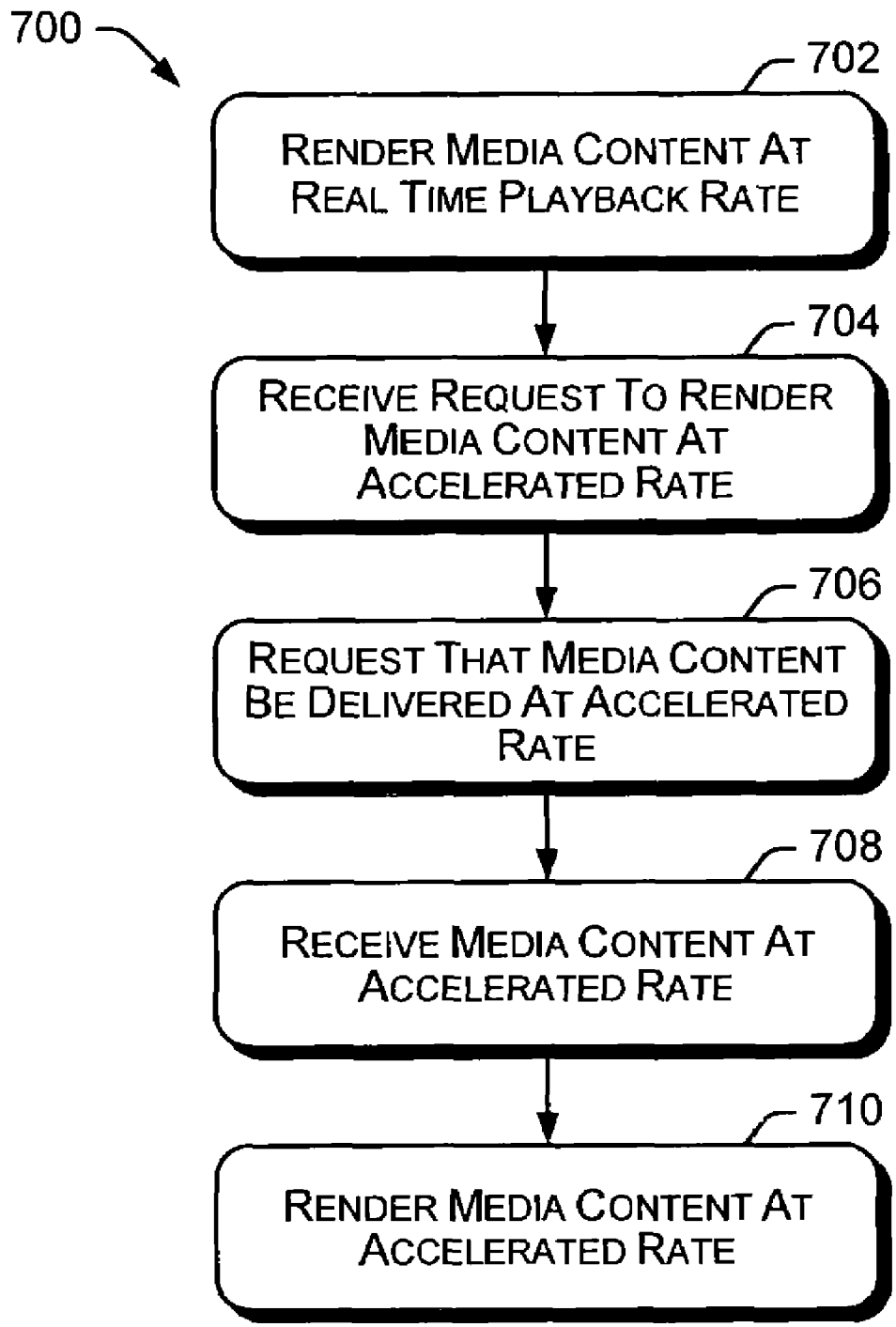

FIG. 7 shows an exemplary method 700 for implementing variable play speed control of media streams on a media player 206. At block 702, a media player 206 renders media content at a real time playback rate. The real time playback rate is the normal rate at which the media content is intended to be consumed. The media content typically includes streams of audio and video data but may also include other non-video/audio data such as script commands for triggering events, text captions, and metadata that is synchronized for rendering at particular times or locations within the video content.

At block 704 of method 700, the media player 206 receives a request to render the media content at an accelerated rate. The request is initiated either by an end user through a variable play speed control 214 of the media player 206, or it is initiated by a call to an application programming interface (API) 224 of the media player 206 from an application program 232.

At block 706, the media player 206 requests that the media content be delivered at the accelerated rate. The presumption in this case (i.e., method 700) is that the source of the media content is a streaming media server 104 that is capable of comprehending such requests for data delivery at variable rates, and, that the streaming media server 104 is capable of delivering data at the requested variable rates. At block 708, the media player 206 receives the media content at the requested accelerated rate. And at block 710, the media player 206 renders the media content at the accelerated rate.

Figure 8:
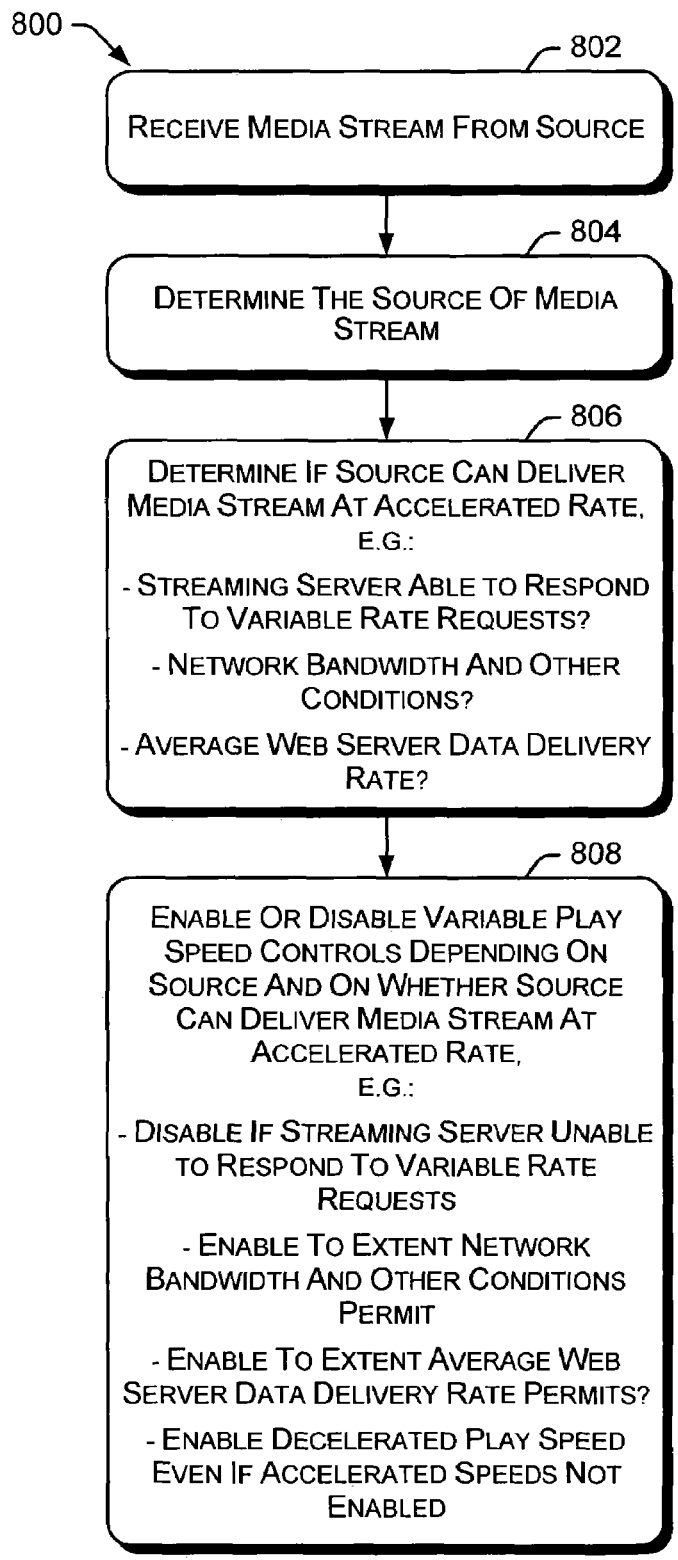

FIG. 8 shows another exemplary method 800 for implementing variable play speed control of media streams on a media player 206. At block 802, a media player 206 receives a media stream from a source. The source is typically either a local media file 200 already residing on a client computer 102 on which the media player 206 is executing, a standard Web server 106 having media files 202 available for downloading, or a streaming media server 104 having media files 204 available for streaming delivery. At block 804, the media player 206 determines through a source layer 229, which of these devices is the source of the media content.

At block 806, if the source is not a local media file 200, the media player 206 determines whether or not the source is capable of delivering the media stream at a variable rate. Note that if the source is a local media file 200, well-known delivery mechanisms within the client computer 102 are presumed to be able to deliver the media stream at an accelerated rate. The determination at block 806 is made by queries from a playback module 220 through a network layer 230 which can determine, for example, if a streaming media server 104 can respond to variable rate requests, if network bandwidth and other conditions will permit an accelerated delivery rate, and so on. In another variation where the source is a standard Web server 106, the network layer 230 in conjunction with the playback module 220 measures the average rate at which data arrives from the Web server 106. If this rate is "accelerated", compared to the normal playback rate, then the Web server 106 source is considered capable of delivering data at an accelerated rate. However, should the network conditions later deteriorate, the Web server 106 source may be considered not capable of delivering the data at accelerated rates until the network conditions once again improve.

At block 808 of method 800, the media player 206 enables or disables variable play speed controls 214 of the media player 206 depending on the source and on whether the source is capable of delivering the media stream at the accelerated rate. Thus, for example, the variable play speed controls 214 may be disabled while a progressive file download occurs from a standard Web server 106 if it is determined that the average data delivery rate is not "accelerated", compared to the normal playback rate. However, once the download was completed, the controls would be enabled, because the file would then be a local media file which, as mentioned above, is capable of delivery at an accelerated rate via known delivery mechanisms of the client computer 102. The variable play speed controls 214 can also be partially enabled/disabled depending on data delivery conditions. For example, if the average download rate from a Web server 106 is 3.0× the real-time playback rate, the variable play speed controls 214 may be enabled to allow the user to request a playback speed in the range of 0.0× to 3.0×. In this example, playback speeds at rates greater than 3.0× would be disabled by the playback module 220. Furthermore, where the data delivery rate does not permit an accelerated playback rate, the variable play speed controls 214 may still be enabled to allow the user to request a decelerated playback speed in the range of, for example, 0.0× to −2.0×.

FIG. 9 shows another exemplary method 900 for implementing variable play speed control of media streams on a media player 206. At block 902, a streaming media server 104 receives a request from a media player 206 executing on a client computer 102 to deliver media content at an accelerated rate. The accelerated rate is a rate beyond the normal, real time playback rate that the media content is intended to be consumed. At block 904, the streaming media server 104 determines if it has the capacity to, and if the network link is able to, support the accelerated rate being requested. At block 906, the streaming media server 104 delivers the media content to the client computer 102 at the accelerated rate if its capacity and the network link can support the accelerated rate. However, at block 908, if either the streaming media server 104 capacity or the network link will not support the accelerated rate, then the streaming media server 104 can either drop data from the media content being requested (i.e., reduce the quality), or it can deliver the media content at the normal, real time playback rate of the media content. Dropping data from the media content may include dropping an audio data stream and/or dropping video frames from video content such that only key video frames are delivered to the client computer 102.

While one or more methods have been disclosed by means of flow diagrams and text associated with the blocks of the flow diagrams, it is to be understood that the blocks do not necessarily have to be performed in the order in which they were presented, and that an alternative order may result in similar advantages. Furthermore, the methods are not exclusive and can be performed alone or in combination with one another.

Exemplary Computer

FIG. 10 illustrates an exemplary computing environment suitable for implementing a client computer 102, a streaming media server 104, and a standard Web server 106. Although one specific configuration is shown, client computer 102, streaming media server 104, and standard Web server 106 may be implemented in other computing configurations.

The computing environment 1000 includes a general-purpose computing system in the form of a computer 1002. The components of computer 1002 can include, but are not limited to, one or more processors or processing units 1004, a system memory 1006, and a system bus 1008 that couples various system components including the processor 1004 to the system memory 1006.

The system bus 1008 represents one or more of any of several types of bus structures, including a memory bus or memory controller, a peripheral bus, an accelerated graphics port, and a processor or local bus using any of a variety of bus architectures. An example of a system bus 1008 would be a Peripheral Component Interconnects (PCI) bus, also known as a Mezzanine bus.

Computer 1002 typically includes a variety of computer readable media. Such media can be any available media that is accessible by computer 1002 and includes both volatile and non-volatile media, removable and non-removable media. The system memory 1006 includes computer readable media in the form of volatile memory, such as random access memory (RAM) 1010, and/or non-volatile memory, such as read only memory (ROM) 1012. A basic input/output system (BIOS) 1014, containing the basic routines that help to transfer information between elements within computer 1002, such as during start-up, is stored in ROM 1012. RAM 1010 typically contains data and/or program modules that are immediately accessible to and/or presently operated on by the processing unit 1004.

Computer 1002 can also include other removable/non-removable, volatile/non-volatile computer storage media. By way of example, FIG. 10 illustrates a hard disk drive 1016 for reading from and writing to a non-removable, non-volatile magnetic media (not shown), a magnetic disk drive 1018 for reading from and writing to a removable, non-volatile magnetic disk 1020 (e.g., a "floppy disk"), and an optical disk drive 1022 for reading from and/or writing to a removable, non-volatile optical disk 1024 such as a CD-ROM, DVD-ROM, or other optical media. The hard disk drive 1016, magnetic disk drive 1018, and optical disk drive 1022 are each connected to the system bus 1008 by one or more data media interfaces 1026. Alternatively, the hard disk drive 1016, magnetic disk drive 1018, and optical disk drive 1022 can be connected to the system bus 1008 by a SCSI interface (not shown).

The disk drives and their associated computer-readable media provide non-volatile storage of computer readable instructions, data structures, program modules, and other data for computer 1002. Although the example illustrates a hard disk 1016, a removable magnetic disk 1020, and a removable optical disk 1024, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1016, magnetic disk 1020, optical disk 1024, ROM 1012, and/or RAM 1010, including by way of example, an operating system 1026, one or more application programs 1028, other program modules 1030, and program data 1032. Each of such operating system 1026, one or more application programs 1028, other program modules 1030, and program data 1032 (or some combination thereof) may include an embodiment of a caching scheme for user network access information.

Computer 1002 can include a variety of computer/processor readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 1002 via input devices such as a keyboard 1034 and a pointing device 1036 (e.g., a "mouse"). Other input devices 1038 (not shown specifically) may include a microphone, joystick, game pad, satellite dish, serial port, scanner, and/or the like. These and other input devices are connected to the processing unit 1004 via input/output interfaces 1040 that are coupled to the system bus 1008, but may be connected by other interface and bus structures, such as a parallel port, game port, or a universal serial bus (USB).

A monitor 1042 or other type of display device can also be connected to the system bus 1008 via an interface, such as a video adapter 1044. In addition to the monitor 1042, other output peripheral devices can include components such as speakers (not shown) and a printer 1046 which can be connected to computer 1002 via the input/output interfaces 1040.

Computer 1002 can operate in a networked environment using logical connections to one or more remote computers, such as a remote computing device 1048. By way of example, the remote computing device 1048 can be a personal computer, portable computer, a server, a router, a network computer, a peer device or other common network node, and the like. The remote computing device 1048 1is illustrated as a portable computer that can include many or all of the elements and features described herein relative to computer system 1002.

Logical connections between computer 1002 and the remote computer 1048 are depicted as a local area network (LAN) 1050 and a general wide area network (WAN) 1052. Such networking environments are commonplace in offices, enterprise-wide computer networks, intranets, and the Internet. When implemented in a LAN networking environment, the computer 1002 is connected to a local network 1050 via a network interface or adapter 1054. When implemented in a WAN networking environment, the computer 1002 typically includes a modem 1056 or other means for establishing communications over the wide network 1052. The modem 1056, which can be internal or external to computer 1002, can be connected to the system bus 1008 via the input/output interfaces 1040 or other appropriate mechanisms. It is to be appreciated that the illustrated network connections are exemplary and that other means of establishing communication link(s) between the computers 1002 and 1048 can be employed.

In a networked environment, such as that illustrated with computing environment 1000, program modules depicted relative to the computer 1002, or portions thereof, may be stored in a remote memory storage device. By way of example, remote application programs 1058 reside on a memory device of remote computer 1048. For purposes of illustration, application programs and other executable program components, such as the operating system, are illustrated herein as discrete blocks, although it is recognized that such programs and components reside at various times in different storage components of the computer system 1002, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A computer-readable storage medium encoded with instructions that, when executed, direct a computer to perform a method, the method comprising:
    indicating via a graphical user interface, a range of accelerated bit rates at which media content may be received from a source;
    requesting the media content from the source at an accelerated bit rate selected from the range of accelerated bit rates, the accelerated bit rate being a rate that exceeds a normal playback rate;
    receiving a media stream at the accelerated bit rate, wherein the media stream is an uninterrupted data stream of the media content that has no intentionally dropped data;
    rendering all content in the media stream at the accelerated bit rate; and
    partially enabling, enabling, and disabling variable play speed controls depending on the source,
    wherein the partially enabling, enabling, and disabling comprises enabling the variable play speed controls such that any play speeds that are enabled do not exceed a maximum accelerated bit rate at which the source can deliver the media stream without intentionally dropping portions of the media content.

2. A computer-readable storage medium as recited in claim 1, wherein the media stream comprises a video stream and an audio stream, the rendering comprising:
    processing the video stream and the audio stream through a playback filter graph at the accelerated bit rate; and
    implementing a pitch adjustment algorithm within the playback filter graph to process the audio stream.

3. A computer-readable storage medium as recited in claim 2, wherein the media stream further comprises a non-video/non-audio data stream synchronized to the video stream and the audio stream, the rendering further comprising processing the non-video/non-audio data stream at synchronized locations within the video stream and the audio stream.

4. A computer-readable storage medium as recited in claim 3, wherein the non-video/non-audio data stream includes data selected from the group comprising:
    script commands;
    metadata; and
    captions.

5. A computer-readable storage medium as recited in claim 1, wherein the method further comprises:
    receiving a degraded media stream at a reduced rate, wherein the degraded media stream includes a subset of data from the media stream; and
    rendering the degraded media stream at the reduced rate.

6. A computer-readable storage medium as recited in claim 5, wherein the degraded media stream comprises a video stream that has dropped video frames and wherein an audio stream of the media stream has been dropped.

7. A computer-readable storage medium as recited in claim 1, wherein the source is selected from the group comprising:
    a streaming media server; and
    a local storage medium.

8. A computer comprising the computer-readable storage medium as recited in claim 1.

9. A computer-readable storage medium encoded with instructions that, when executed, direct a computing system to perform a method comprising:
    receiving previously stored, non-live media content via a media stream;
    determining a source of the media stream;
    determining if the source can deliver the media stream at an accelerated bit rate designated by a user; and
    partially enabling, enabling and disabling variable play speed controls depending on the source,
    wherein the partially enabling, enabling, and disabling comprises enabling the variable play speed controls such that any play speeds that are enabled do not exceed a maximum accelerated bit rate at which the source can deliver the media stream without intentionally dropping portions of the media content.

10. A computer-readable storage medium as recited in claim 9, wherein the determining if the source can deliver the media stream at an accelerated bit rate comprises determining an average data delivery rate from the source.

11. A computer-readable storage medium as recited in claim 9, wherein the method further comprises enabling the variable play speed controls if the source is a streaming media server capable of delivering the media stream at the accelerated bit rate.

12. A computer-readable storage medium as recited in claim 9, wherein the method further comprises:
    partially enabling variable play speed controls in an accelerated playback range if the source is a streaming media server that is not capable of delivering the media stream at the accelerated bit rate but is capable of delivering the media stream at an accelerated rate that does not exceed the average data delivery rate; and
    enabling variable play speed controls in a decelerated playback range.

13. A computer-readable storage medium as recited in claim 9, wherein the method further comprises disabling the variable play speed controls if the source is a web server delivering the media stream as a progressively downloaded file.

14. A computer-readable storage medium as recited in claim 13, wherein the method further comprises enabling the variable play speed controls after the media stream is completely downloaded from the web server.

15. A computer-readable storage medium as recited in claim 9, wherein the method further comprises enabling the variable play speed controls if the source is a local media source.

16. A computer-readable storage medium as recited in claim 9, wherein the method further comprises playing back the media stream at the accelerated bit rate, wherein the playing back includes rendering all content within the media stream.

17. A computer-readable storage medium as recited in claim 9, wherein the enabling and the disabling comprise altering graphical representations of the variable play speed controls on a graphical user interface.

18. A computer-readable storage medium as recited in claim 9, wherein the variable play speed controls include:
 a play speed control configured to vary a playback rate of the media stream between a rate that is less than a real time rate and a rate that greater than the real time rate;
 a fast forward control configured to increase the playback rate of the media stream to a rate that exceeds the real time rate;
 a rewind control configured to decrease the playback rate of the media stream to a negative rate;
 a seek control configured to access a particular playback location within the media stream;
 a next frame control configured to step the playback rate of the media stream forward one video frame at a time; and
 a previous frame control configured to step the playback rate of the media stream backward one video frame at a time.

19. A computer-readable storage medium as recited in claim 9, wherein the source is selected from a group comprising:
 local media;
 a streaming media server; and
 a web server.

20. A computer-readable storage medium as recited in claim 9, wherein the media stream comprises data selected from the group comprising:
 audio data;
 video data;
 script commands;
 text captions; and
 metadata.

21. A computer comprising the computer-readable storage medium as recited in claim 9.

22. A computer-readable storage medium encoded with instructions that, when executed, direct a computing system to perform a method, the method comprising:
 determining a media source of a media file, the media file comprising a local media file, a progressive download media file from a web server, or a media stream from a streaming media server;
 presenting via a graphical user interface, a variable play speed control that indicates a range of recommended non-real-time bit rates;
 sending a request to the media source to deliver the media file at a non-real-time bit rate selected by a user from the range of recommended non-real-time bit rates;
 altering an appearance of the variable play speed control at the user graphic interface to indicate whether the variable play speed control is disabled, partially enabled or fully enabled;
 in an event that the media source is the local media file, fully enabling the variable play speed control;
 in an event that the media source is the progressive downloaded media file from the web server,
 initially disabling the variable play speed control;
 measuring an average rate at which the media file is being progressively downloaded from the web server;
 partially enabling the variable play speed control to permit the user to request a non-real-time bit rate that does not exceed the average rate;
 fully enabling the variable play speed control when the media file has been downloaded; and in an event that the media source is the media file from the streaming media server,
 determining if the media source and a network link can support the non-real-time bit rate without intentionally dropping data from the media content;
 in an event that the media source and the network link can support the non-real-time bit rate,
 enabling the variable play speed control; and
 receiving and playing back the media content at the non-real-time rate;
 in an event that the media source and the network link cannot support the non-real-time bit rate,
 disabling the variable play speed control;
 caching the media stream at a client device;
 measuring an allowable rate at which the media file is being downloaded from the streaming media server;
 partially enabling the variable play speed control to permit the user to request a non-real-time bit rate that does not exceed the allowable rate; and
 fully enabling the variable play speed control once the cached media stream can enable the non-real-time bit rate.

23. A computer-readable storage medium as recited in claim 22, wherein the non-real-time bit rate is a rate selected from the group comprising:
 an accelerated bit rate; and
 a decelerated bit rate.

24. A computer-readable storage medium as recited in claim 22, wherein the non-real-time bit rate is an accelerated bit rate, and wherein the method further comprises:
 determining that the media source and/or the network link cannot support the accelerated bit rate without intentionally dropping data from the media content; and
 sending a request to the media source to drop data from the media content and to stream remaining media content from the media file.

25. A computer-readable storage medium as recited in claim 24, wherein the remaining media content is streamed from the media source within a period of time equal to a period of time that would be needed to stream all the media content from the media source at the accelerated bit rate.

26. A computer-readable storage medium as recited in claim 24, wherein data dropped from the media content is selected from the group comprising:
 an audio data stream;
 video frames from a video data stream; and
 a non-video/audio data stream.

27. A computer-readable storage medium as recited in claim 22, wherein the non-real-time bit rate is an accelerated bit rate, and wherein the method further comprises:
  determining that the media source and/or the network link cannot support the accelerated bit rate without intentionally dropping data from the media content; and
  in response to determining that the media source and/or the network link cannot support the accelerated bit rate without intentionally dropping data from the media content, sending a request to the media source to stream the media content stream from the media file at a normal real-time bit rate.

28. A computer comprising the computer-readable storage medium as recited in claim 22.

29. A computer-readable storage medium encoded with instructions that, when executed, direct a computing system to perform a method comprising:
  streaming a media stream to a client at a real time rate;
  receiving a request from the client to deliver the media stream at an accelerated bit rate;
  delivering the media stream to the client at the accelerated bit rate when the accelerated bit rate is within a delivery bit rate limitation, wherein no data is intentionally dropped from the media stream to achieve the accelerated bit rate;
  delivering a video portion of the media stream and stopping delivery of an audio portion of the media stream to the client when the accelerated bit rate exceeds the delivery bit rate limitation, thereby enabling the client to display the video portion of the media stream at the accelerated bit rate; and
  partially enabling, enabling, and disabling variable play speed controls depending on a source of the media stream,
  wherein the partially enabling, enabling, and disabling comprises enabling the variable play speed controls such that any play speeds that are enabled do not exceed a maximum accelerated bit rate at which the source can deliver the media stream without intentionally dropping portions of the media content.

30. A computer-readable storage medium as recited in claim 29, wherein the method further comprises:
  determining that a network link cannot support the accelerated bit rate without dropping data from the media stream; and
  delivering the media stream to the client at a reduced bit rate that is less than the accelerated bit rate without dropping data from the media stream.

31. A computer-readable storage medium as recited in claim 29, wherein the method further comprises:
  determining that a network link cannot support the accelerated bit rate;
  delivering the media stream to the client at a reduced rate that is less than the accelerated bit rate; and
  while delivering the media stream to the client user at the reduced rate dropping data from the media stream.

32. A streaming media server comprising the computer-readable storage medium as recited in claim 29.

33. A client computer comprising a media player, the media player comprising
  variable play speed controls configured to partially enable, enable and disable variable playback speed controls for playing a media stream depending on a source of the media stream,
  wherein the partially enabling, enabling, and disabling comprises enabling the variable play speed controls such that any play speeds that are enabled do not exceed a maximum accelerated bit rate at which the source can deliver the media stream without intentionally dropping portions of the media content.

34. A media player as recited in claim 33, further comprising a playback module configured to partially enable, enable or disable the variable play speed controls depending on the source and on whether the source can deliver the media stream at an accelerated bit rate, the playback module additionally configured to determine the source and whether the source can deliver the media stream at a requested rate.

35. A media player as recited in claim 33, further comprising a graphical user interface (GUI) module configured to support a GUI that presents the variable play speed controls to a user and enables the user to activate the variable play speed controls.

36. A media player as recited in claim 33, further comprising an application programming interface configured to expose the variable play speed controls to programmatic control of a custom application program.

37. A media player as recited in claim 33, wherein the variable play speed controls are selected from the group comprising:
  a play speed control configured to vary a playback rate of the media stream between a rate that is less than a real time rate and a rate that greater than the real time rate;
  a fast forward control configured to increase the playback rate of the media stream to a rate that exceeds the real time rate;
  a rewind control configured to decrease the playback rate of the media stream to a negative rate;
  a seek control configured to access a particular playback location within the media stream;
  a next frame control configured to step the playback rate of the media stream forward one video frame at a time; and
  a previous frame control configured to step the playback rate of the media stream backward one video frame at a time. capability determined by the playback module according to a source of the media stream and whether the source can deliver the media stream at an accelerated bit rate.

38. A client computer comprising a media player, the media player comprising:
  controls for varying playback speed of a media stream, the controls comprising:
  a play speed control configured to vary a playback rate of the media stream between a rate that is less than a real time rate and a rate that is greater than the real time rate;
  a fast forward control configured to increase the playback rate of the media stream to a rate that exceeds the real time rate;
  a rewind control configured to decrease the playback rate of the media stream to a negative rate;
  a seek control configured to access a particular playback location within the media stream;
  a next frame control configured to step the playback rate of the media stream forward one video frame at a time; and
  a previous frame control configured to step the playback rate of the media stream backward one video frame at a time; and
  a playback module configured to partially enable, enable and disable the controls to reflect a current play speed control capability, the current play speed control capability determined by the playback module according to a source of the media stream,
  wherein the partially enabling, enabling, and disabling comprises enabling the variable play speed controls such that any play speeds that are enabled do not exceed a maximum accelerated bit rate at which the source can deliver the media stream without intentionally dropping portions of the media content.

39. A media player as recited in claim 38, further comprising a graphical user interface (GUI) module configured to support a GUI graphical that presents the controls to a user and enables the user to activate the controls.

40. A media player as recited in claim 38, further comprising an application programming interface configured to expose the controls to programmatic control of a custom application program.

41. A computer comprising:
means for indicating via a graphical user interface, a range of accelerated bit rates at which media content may be displayed;
means for requesting media content at an accelerated bit rate selected from the range of accelerated bit rates from a source;
means for receiving a media data stream from the source at the accelerated bit rate, wherein the media data stream has no intentionally dropped data of the media content; and
means for rendering all content in the media data stream at the accelerated bit rate;
partially enabling, enabling, and disabling variable play speed controls depending on the source,
wherein the partially enabling, enabling, and disabling comprises enabling the variable play speed controls such that any play speeds that are enabled do not exceed a maximum accelerated bit rate at which the source can deliver the media stream without intentionally dropping portions of the media content.

42. A computer as recited in claim 41, wherein the media data stream comprises a video data stream, an audio data stream and a non-video/audio data stream synchronized to the video data stream, the means for rendering further comprising:
means for processing the video data stream and the audio data stream through a playback filter graph at the accelerated bit rate;
means for implementing a pitch adjustment algorithm within the playback filter graph to process the audio data stream; and
means for processing the non-video/audio data stream at synchronized locations within the video data stream.

43. A computer as recited in claim 41, further comprising:
means for receiving a degraded media data stream at a reduced rate, wherein the degraded media data stream includes a subset of data from the media data stream; and
means for rendering the degraded media data stream at the reduced rate.

44. A computer comprising:
means for receiving a media stream;
means for determining a source of the media stream;
means for determining if the source can deliver the media stream at an accelerated bit rate without intentionally dropping data from the media stream; and
means for partially enabling, enabling and disabling variable play speed controls depending on the source,
wherein the partially enabling, enabling, and disabling comprises enabling the variable play speed controls such that any play speeds that are enabled do not exceed a maximum accelerated bit rate at which the source can deliver the media stream without intentionally dropping portions of the media content.

45. A computer as recited in claim 44, wherein the means for determining if the source can deliver the media stream at an accelerated bit rate comprises means for determining an average data delivery rate from the source.

46. A computer as recited in claim 44, further comprising means for enabling the variable play speed controls if the source is a streaming media server capable of delivering the media stream at the accelerated bit rate.

47. A computer as recited in claim 44, further comprising:
means for disabling variable play speed controls in an accelerated playback range if the source is a streaming media server that is not capable of delivering the media stream at the accelerated bit rate; and
means for enabling variable play speed controls in a decelerated playback range.

48. A computer as recited in claim 44, further comprising means for disabling the variable play speed controls if the source is a web server delivering the media stream as a progressively downloaded file.

49. A computer as recited in claim 48, further comprising means for enabling the variable play speed controls after the media stream is completely downloaded from the web server.

50. A computer as recited in claim 44, further comprising means for enabling the variable play speed controls if the source is a local media source.

51. A computer as recited in claim 44, further comprising means for playing back the media stream at the accelerated bit rate, wherein the playing back includes rendering all content within the media stream.

52. A computer as recited in claim 44, further comprising means for altering a graphical user interface having representations of the variable play speed controls to reflect the enabling and the disabling of the variable play speed controls.

53. A computer as recited in claim 44, wherein the variable play speed controls include:
a play speed control configured to vary a playback rate of the media stream between a rate that is less than a real time rate and a rate that greater than the real time rate, wherein the play speed control is enabled, disabled, or partially enabled;
a fast forward control configured to increase the playback rate of the media stream to a rate that exceeds the real time rate;
a rewind control configured to decrease the playback rate of the media stream to a negative rate;
a seek control configured to access a particular playback location within the media stream;
a next frame control configured to step the playback rate of the media stream forward one video frame at a time; and
a previous frame control configured to step the playback rate of the media stream backward one video frame at a time.

54. A computer comprising:
means for sending a request to a media source to stream media content from a media file at a non-real-time bit rate;
means for determining if the media source and a network link can support the non-real-time bit rate without intentionally dropping data from the media content;
means for receiving and playing back the media content at the non-real-time bit rate if the media source and a network link can support the non-real-time rate without intentionally dropping data from the media content;
means for receiving only video data and stopping receipt of audio data of the media stream if the media source and a network link cannot support the non-real-time rate without intentionally dropping data from the media content, thereby enabling playback of the video data of the media stream at the non-real-time bit rate; and partially enabling, enabling, and disabling variable play speed controls depending on the source,
wherein the partially enabling, enabling, and disabling comprises enabling the variable play speed controls such that any play speeds that are enabled do not exceed a maximum accelerated bit rate at which the source can deliver the media stream without intentionally dropping portions of the media content.

55. A computer as recited in claim 54, wherein the non-real-time bit rate is a rate selected from the group comprising:
an accelerated bit rate; and
a decelerated bit rate.

56. A computer as recited in claim 54, wherein the non-real-time rate is an accelerated bit rate, the computer further comprising:
means for determining that the media source and/or the network link cannot support the accelerated bit rate without dropping data from the media content; and
means for sending a request to the media source to drop data from the media content and to stream remaining media content from the media file.

57. A computer as recited in claim 56, wherein data dropped from the media content is selected from the group comprising:
an audio data stream;
video frames from a video data stream; and
a non-video/audio data stream.

58. A computer as recited in claim 54, wherein the non-real-time bit rate is an accelerated bit rate, the computer further comprising:
means for determining that the media source and/or the network link cannot support the accelerated bit rate without intentionally dropping data from the media content; and
means for sending a request to the media source to stream the media content stream from the media file at a normal real-time rate.

59. A streaming media server comprising:
means for streaming a media stream to a client at a real time rate;
means for receiving a request from the client to deliver the media stream at an accelerated bit rate;
means for delivering the media stream to the client at the accelerated bit rate when the accelerated bit rate does not exceed a delivery bit rate limitation, without intentionally dropping data to achieve the accelerated bit rate;
means for delivering only key video frames and synchronized text captions that occur with the key video frames of the media stream to the client, when the accelerated bit rate exceeds the delivery bit rate limitation, to still enable the client to display the media stream at the accelerated bit rate; and
partially enabling, enabling, and disabling variable play speed controls depending on a source of the media stream,
wherein the partially enabling, enabling, and disabling comprises enabling the variable play speed controls such that any play speeds that are enabled do not exceed a maximum accelerated bit rate at which the source can deliver the media stream without intentionally dropping portions of the media content.

60. A streaming media server as recited in claim 59, further comprising:
means for determining that a network link cannot support the accelerated bit rate; and
means for delivering the media stream to the client at a reduced rate that is less than the accelerated bit rate.

61. A streaming media server as recited in claim 59, further comprising:
means for determining that a network link cannot support the accelerated bit rate;
means for delivering the media stream to the client at a reduced bit rate that is less than the accelerated bit rate; and
means for dropping data from the media stream while delivering the media stream to the client user at the reduced bit rate.

62. A streaming media server comprising
a variable speed streaming module configured to indicate a range of allowable accelerated bit rates and receive a request to stream media content at an accelerated bit rate in the range of allowable accelerated bit rates and to stream the media content at the accelerated bit rate without dropping any data from the media content, the accelerated bit rate being a rate that exceeds a real time playback rate of the media content; and
partially enabling, enabling, and disabling variable play speed controls depending on a source of the media content,
wherein the partially enabling, enabling, and disabling comprises enabling the variable play speed controls such that any play speeds that are enabled do not exceed a maximum accelerated bit rate at which the source can deliver the media content without intentionally dropping portions of the media content.

63. A streaming media server as recited in claim 62, wherein the variable speed streaming module is further configured to control variable play speed controls of a media player executing on a client computer.

64. A method comprising:
indicating via a graphical user interface, a range of accelerated bit rates for displaying media content;
rendering a stream of media at a real time playback rate;
receiving a request to render the stream of media at an accelerated bit rate in the range of accelerated bit rates;
sending a request to have the stream of media delivered at the accelerated bit rate;
receiving the stream of media at the accelerated bit rate, wherein the stream of media that is received at the accelerated bit rate has no intentionally dropped data; and
rendering the stream of media at the accelerated bit rate; and
partially enabling, enabling, and disabling variable play speed controls depending on a source of the media stream,
wherein the partially enabling, enabling, and disabling comprises enabling the variable play speed controls such that any play speeds that are enabled do not exceed a maximum accelerated bit rate at which the source can deliver the media stream without intentionally dropping portions of the media content.

65. A method as recited in claim 64, wherein the media stream comprises a video stream and an audio stream and wherein rendering comprises:
processing the video stream and the audio stream through a playback filter graph at the accelerated bit rate; and
implementing a pitch adjustment algorithm within the playback filter graph to process the audio stream.

66. A method as recited in claim 65, wherein the media stream further comprises a non-video/non-audio data stream synchronized to the video stream and the audio stream and wherein rendering further comprises processing the non-video/non-audio data stream at synchronized locations within the video stream and the audio stream.

67. A method comprising:
receiving a media stream from a source;
determining the source of the media stream;
determining if the source can deliver the media stream at an accelerated bit rate without intentionally dropping data from the media stream; and
partially enabling, enabling or disabling variable play speed controls depending on the source,
wherein the partially enabling, enabling, and disabling comprises enabling the variable play speed controls such that any play speeds that are enabled do not exceed a maximum accelerated bit rate at which the source can deliver the media stream without intentionally dropping portions of the media content.

68. A method as recited in claim 67, further comprising:
partially enabling the variable play speed controls to enable user selection of only those accelerated bit rates that do not exceed a delivery bit rate limitation;
enabling the variable play speed controls if the source is a streaming media server capable of delivering the media stream at the accelerated bit rate; and
disabling the variable play speed controls if the source is a streaming media server that is not capable of delivering the media stream at an accelerated bit rate.

69. A method as recited in claim 67, wherein the source is a web server delivering the media stream as a progressively downloaded file, the method further comprising:
disabling the variable play speed controls while the progressively downloaded file is being delivered; and
enabling the variable play speed controls after the progressively downloaded is completely downloaded.

* * * * *